United States Patent
Choi (10) Patent No.: US 9,066,255 B2
(45) Date of Patent: Jun. 23, 2015

(54) DISTRIBUTED LOAD CONTROL THE MOBILE COMMUNICATION NETWORK

(75) Inventor: Sung Gu Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 423 days.

(21) Appl. No.: 13/330,141

(22) Filed: Dec. 19, 2011

(65) Prior Publication Data

US 2012/0163168 A1    Jun. 28, 2012

(30) Foreign Application Priority Data

Dec. 22, 2010    (KR) ........................ 10-2010-0132886

(51) Int. Cl.
| | |
|---|---|
| H04W 72/04 | (2009.01) |
| H04W 28/08 | (2009.01) |
| H04W 28/02 | (2009.01) |
| H04W 48/16 | (2009.01) |
| H04W 72/00 | (2009.01) |
| H04W 76/02 | (2009.01) |
| H04W 88/08 | (2009.01) |

(52) U.S. Cl.
CPC .......... *H04W 28/08* (2013.01); *H04W 28/0289* (2013.01); *H04W 48/16* (2013.01); *H04W 72/00* (2013.01); *H04W 76/02* (2013.01); *H04W 88/08* (2013.01)

(58) Field of Classification Search
CPC ....... H04L 47/10; H04W 88/08; H04W 74/04
USPC ........... 370/230, 232, 347, 329; 455/518, 509
See application file for complete search history.

(56) References Cited

U.S. PATENT DOCUMENTS

| | | | |
|---|---|---|---|
| 2009/0016239 A1* | 1/2009 | Honjo ........................... | 370/253 |
| 2009/0129342 A1* | 5/2009 | Hwang et al. ................. | 370/331 |
| 2010/0124933 A1* | 5/2010 | Chowdhury et al. ......... | 455/453 |
| 2010/0190497 A1* | 7/2010 | Pudney et al. ............. | 455/435.1 |
| 2011/0149907 A1* | 6/2011 | Olsson et al. ................. | 370/331 |
| 2012/0033623 A1* | 2/2012 | Chu et al. ...................... | 370/329 |
| 2012/0039171 A1* | 2/2012 | Yamada et al. ............... | 370/232 |

* cited by examiner

*Primary Examiner* — Ian N Moore
*Assistant Examiner* — Hien Nguyen
(74) *Attorney, Agent, or Firm* — Nelson Mullins Riley & Scarborough LLP (57) ABSTRACT

A base station determines whether the base station is in an overload state on the basis of an available resource of the base station and a load state of a mobility management entity (MME), and transmits the call setup request to MME if the base station is determined to be in a non-overload state. MME determines whether MME is in the overload state on the basis of an available resource of MME and a load state of a gateway according to the call setup request transmitted from the base station, and transmits the call setup request to the gateway if MME is determined to be in the non-overload state. The gateway determines whether the gateway is in the overload state according to the call setup request transmitted from MME, and performs a call setup procedure if the gateway is determined to be in the non-overload state.

16 Claims, 3 Drawing Sheets

DISTRIBUTED LOAD CONTROL THE MOBILE COMMUNICATION NETWORK

CLAIM FOR PRIORITY

This application claims priority to Korean Patent Application No. 10-2010-0132886 filed on Dec. 22, 2010 in the Korean Intellectual Property Office (KIPO), the entire contents of which are hereby incorporated by reference.

BACKGROUND

1. Technical Field

Example embodiments of the present invention relate to load control of a mobile communication system, and more particularly, to a mobile communication system for distributed load control and a distributed load control method for use in the same that provide a machine-type communication (MTC) service.

2. Related Art

Although 3rd Generation Partnership Project (3GPP) mobile communication systems are securing competitiveness in current mobile communication services through high speed downlink packet access (HSDPA) having an extension of downlink (DL) capacity, and high speed uplink packet access (HSUPA) having an extension of uplink (UL) capacity, new radio access technology is required to secure competitiveness even in future mobile communication services according to rapidly growing information communication society.

For current 3GPP-related technology to have competitiveness in the future, radio access technology of next-generation mobile communication systems (international mobile communications (IMT)-advanced systems) should be significantly considered. Main issues of these next-generation mobile communication systems are reduced latency, higher user data rates, improved system capacity and coverage, cost reduction of a network provider, and the like.

In addition, the next-generation mobile communication system considers interworking and handover with a non-3GPP system such as a wireless local area network (WLAN) as well as interworking with a 3G mobile communication system. Next-generation mobile communication terminals are expected to include a function of simultaneously supporting WLAN and a 3GPP system. In particular, machine to machine (MTM) communication or machine-type communication (MTC) terminals are expected to be widely used for machine-to-human (MTH) communication and MTM communication, in addition to human-to-human communication.

To satisfy requirements and operating environments of the next-generation mobile communication systems as described above, a function of optimized, advanced, and efficient load control is required in the next-generation mobile communication systems.

In the mobile communication system, the load control function prevents the entire system from crashing, or prevents communication from being disconnected by carrying out an operation of limiting a connection or access according to a state when signaling is temporarily increased in each node of the mobile communication system and overload occurs, or when packet data exceeds capacity allowed for a base station and congestion occurs if there is a call setup request.

In general, a load control method is a method of limiting or rejecting a call setup request when overload occurs, a method of temporarily delaying or deleting processing of packet data, or the like.

Because an existing load control method is mainly used for a mobile communication system for human-to-human communication, overload does not largely occur. Accordingly, in the existing load control method, it is determined whether to accept and process a call in consideration of only resource management.

However, various types of multimedia services will be provided in the next-generation mobile communication systems, and the congestion of signaling and traffic is expected to occur due to the advent of MTC terminals. Accordingly, because the existing load control method may be unsuitable for the next-generation mobile communication systems, an optimized load control method for use in the next-generation mobile communication systems is required, but technical development for the optimized load control method is not sufficient.

Many studies have been conducted to allocate radio resources by assuming the same priority for all calls without considering various characteristics for user equipment (UE) services for use in human-to-human communication, or manage radio resources on the basis of received signal strength (RSS) of UE or its moving speed.

Although the studies of the related art as described above may improve the performance of the mobile communication system by efficiently employing limited radio resources having a significant influence on the performance in the mobile communication system, their application to the next-generation mobile communication systems is difficult.

Many studies of radio resource management and the like through buffers, priority, and fuzzy theory have been conducted. These methods are very simple and may not expect improved performance. A radio resource management algorithm based on the fuzzy theory is very complex and unsuitable for commercial systems because its actual implementation is not cost-effective.

Accordingly, there is a need for a load control method capable of reducing or preventing the congestion of signaling and traffic according to MTC service provided in the next-generation mobile communication systems.

SUMMARY

Accordingly, example embodiments of the present invention are provided to substantially obviate one or more problems due to limitations and disadvantages of the related art.

Example embodiments of the present invention provide a mobile communication system for distributed load control capable of reducing processing load of each node of the mobile communication system, and preventing the degradation of quality of service (QoS) due to overload or traffic congestion.

Example embodiments of the present invention also provide a distributed load control method for use in a mobile communication system capable of reducing processing load of each node of the mobile communication system, and preventing the degradation of QoS due to overload or traffic congestion.

In some example embodiments, a mobile communication system includes: a base station including a first load controller configured to collect first load control information including radio resource information and load state information of a first core network device through uplink (UL) and downlink (DL), determine an available resource on the basis of the first load control information when a call setup request is provided from a terminal, and request the first core network device to step up a call if there is the available resource; and a first load state information database (DB) configured to store the first load control information.

The first load controller may determine the available resource by comparing the radio resource information to a preset first threshold, and transmit the call setup request to the first core network device if there is the available resource, and the first core network device is not in an overload state.

The first core network device may include: a second load controller configured to collect second load control information including wired resource information and state information of a second core network device, and determine load control on the basis of the second load control information when the call setup request is provided from the first load controller; and a second load state information DB configured to store the second load control information.

The second load controller may determine an available wired resource by comparing the radio resource information to a preset second threshold, and transmit the call setup request to the second core network device if there is the available wired resource, and the second core network device is not in an overload state.

The second load controller may transmit a call setup reject message to the base station if there is no available wired resource, or the second core network device is in an overload state.

The second core network device may include: a third load controller configured to collect third load control information including resource information for an evolved packet system (EPS) bearer and a packet filter and the state information of the first core network device, and determine load control on the basis of the third load control information when the call setup request is provided from the second load controller; and a third load state information DB configured to store the third load control information.

The third load controller may determine an available resource of the second core network device by comparing the resource information for the EPS bearer and the packet filter to a preset third threshold, and perform a call setup procedure if it is determined that there is the available resource of the second core network.

The third load controller may transmit a call setup reject message to the first core network device if it is determined that there is no available resource of the second core network.

In other example embodiments, a mobile communication system includes a base station, a first core network device, and a second core network, wherein: the base station determines whether the base station is in an overload state on the basis of an available resource of the base station and a load state of the first core network device according to a call setup request provided from a terminal, and transmits the call setup request to the first core network device if the base station is determined to be in a non-overload state; the first core network device determines whether the first core network device is in the overload state on the basis of an available resource of the first core network device and a load state of the second core network device according to the call setup request transmitted from the base station, and transmits the call setup request to the second core network device if the first core network device is determined to be in the non-overload state; and the second core network device determines whether the second core network device is in the overload state according to the call setup request transmitted from the first core network device, and performs a call setup procedure if the second core network device is determined to be in the non-overload state.

In the mobile communication system, the first core network device may transmit a call setup reject message to the base station if the first core network device is determined to be in the overload state, and the second core network device may transmit the call setup reject message to the first core network device if the second core network device is in the overload state.

In still other example embodiments, a load control method for use in a mobile communication system including a base station, a first core network device, and a second core network, includes: determining, by the base station, whether the base station is in an overload state on the basis of an available resource of the base station and a load state of the first core network device according to a call setup request provided from a terminal; transmitting, by the base station, the call setup request to the first core network device if the base station is determined to be in a non-overload state; determining, by the first core network device, whether the first core network device is in the overload state on the basis of an available resource of the first core network device and a load state of the second core network device according to the call setup request transmitted from the base station; transmitting, by the first core network device, the call setup request to the second core network device if the first core network device is determined to be in the non-overload state; determining, by the second core network device, whether the second core network device is in the overload state according to the call setup request transmitted from the first core network device; and performing, by the second core network device, a call setup procedure if the second core network device is determined to be in the non-overload state.

The transmitting, by the first core network device, of the call setup request to the second core network device if the first core network device is determined to be in the non-overload state may include: transmitting, by the first core network device, a call setup reject message to the base station if the first core network device is determined to be in the overload state.

The performing, by the second core network device, of the call setup procedure if the second core network device is determined to be in the non-overload state may include: transmitting, by the second core network device, the call setup reject message to the first core network device if the second core network device is in the overload state.

The determining of whether the base station is in the overload state may include: collecting, by the base station, radio resource information of the base station and load state information of the first core network device through UL and DL; and determining whether there is an available resource of the base station by comparing the collected radio resource information of the base station to a preset first threshold.

The determining of whether the first core network device is in the overload state may include: collecting, by the first core network device, available wired resource information of the first core network device and load state information of the second core network device; and determining whether there is an available resource of the first core network device by comparing the available wired resource information to a preset second threshold.

The determining of whether the second core network device is in the overload state may include: collecting, by the second core network device, available wired resource information of the second core network device and load state information of the first core network device; and determining whether there is an available resource of the second core network device by comparing the available wired resource information to a preset third threshold.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "terminal" may refer to a mobile station (MS), a user terminal (UT), UE, a user terminal, a wireless terminal, an access terminal (AT), a subscriber unit, a subscriber station (SS), a wireless device, a wireless communication device, a wireless transmit/receive unit (WTRU), a mobile node, a mobile, or other terms.

The term "base station" generally denotes a fixed point communicating with a terminal, and may be referred to as a Node-B, an evolved Node-B (eNodeB), a base transceiver system (BTS), an access point, and other terms.

Hereinafter, example embodiments of the present invention will be described in detail with reference to the accompanying drawings. To understand the invention easily, the same elements are designated using the same reference numerals, and redundant description thereof is omitted.

Figure 1:
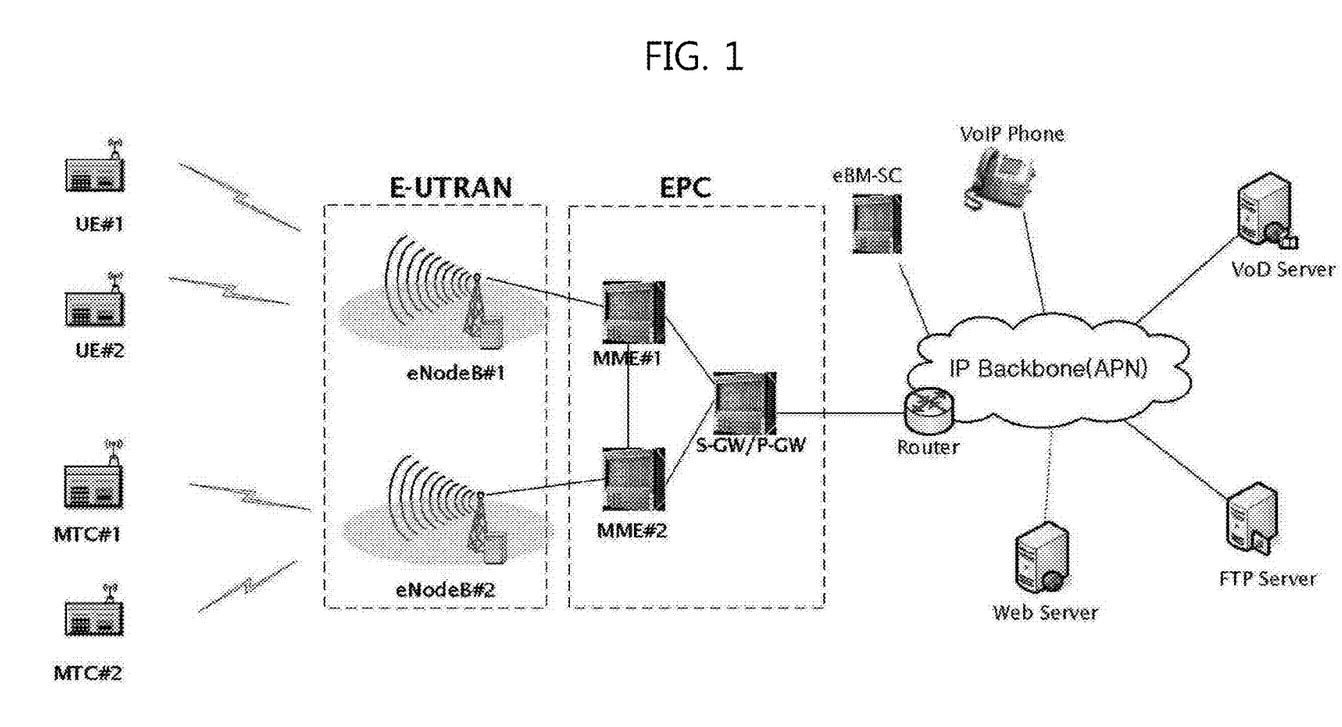
FIG. 1 is a conceptual diagram showing operating environments for a mobile communication system according to an example embodiment of the present invention.

FIG. 1 is a conceptual diagram showing operating environments for a mobile communication system according to an example embodiment of the present invention.

As a fourth-generation (4G) mobile communication system for high-data-rate, low-latency, and packet-optimized radio access technology, a next-generation mobile communication system (IMT-advanced system) provides users with an ultra high-speed broadband mobile multimedia packet service at a low fee. As an evolution of a 3G system of 3GPP, the next-generation mobile communication system is a communication system in which high-speed data transmission is possible, and an Internet protocol (IP)-based service is possible.

Referring to FIG. 1, the next-generation mobile communication system includes UE and/or an MTC terminal for performing a mobile terminal function, at least one eNode-B constituting an evolved universal terrestrial radio access network (E-UTRAN), at least one mobility management entity (MME) for performing mobility and session management functions as one functional entity of a core network (evolved packet core (EPC)), and a gateway (serving gateway (S-GW)/packet data network gateway (P-GW)) for performing an interface function between a mobile communication system and a network so as to effectively provide a high-speed mobile multimedia service satisfying standard requirements. In addition, the core network includes a multi-cell/multicast coordination entity (MCE) for performing a session control function to support an evolved multimedia broadcast/multicast service (EMBMS) function, and an MBMS gateway for performing an MBMS gateway function.

The UE is connected to the E-UTRAN through an air interface, and the E-UTRAN is connected to the core network (EPC) through a wired interface. In addition, the core network (EPC) is connected to an external IP-based network so as to provide various IP-based services.

The radio access network (E-UTRAN) has a simplified system structure by reducing the number of eNodeBs and the number of interfaces to reduce latency and maximize a transmission speed, and is separated into a control plane responsible for control, and a user plane responsible for data transmission, and managed for efficient data transmission and scalability.

In addition, the next-generation mobile communication system provides an optimized IP-based interface to efficiently transmit control information between constituent nodes and transmit user data at a high speed according to its characteristics. Specifically, the next-generation mobile communication system includes a Uu interface between the UE and the radio access network (E-UTRAN), an S1 interface between the radio access network (E-UTRAN) and the core network (EPC), and M1 and M3 interfaces to support the EMBMS function.

In the next-generation mobile communication system, a function of the radio access network (E-UTRAN) is physically implemented by the eNodeB, and the core network (EPC) includes MME, which manages the control plane as in functions of mobility management (MM) and session management (SM), and a user plane entity (UPE), which manages the user plane for data transmission management or the like.

The UE, the MTC terminal, and the eNodeB use wireless transmission technology for satisfying requirements of a high data rate and low latency for the next-generation mobile communication system, and perform an automatic repeat request (ARQ) function, a hybrid ARQ (HARQ) function, and a scheduling function. The above-described functions are performed in physical, media access control (MAC), and radio link control (RLC) layers.

In addition, in the next-generation mobile communication system, a connection of the radio access network and the core network and the inside of the core network may be constructed by an IP-based packet network, various IP-based multimedia services may be seamlessly provided at high quality and low cost, and various services may be selected and used according to a service environment.

In addition, the eNodeB, the MME, and the gateway (S-GW/P-GW) shown in FIG. 1 interwork with each other according to a call setup request provided from the UE and/or the MTC terminal, and perform distributed load control.

Figure 2:
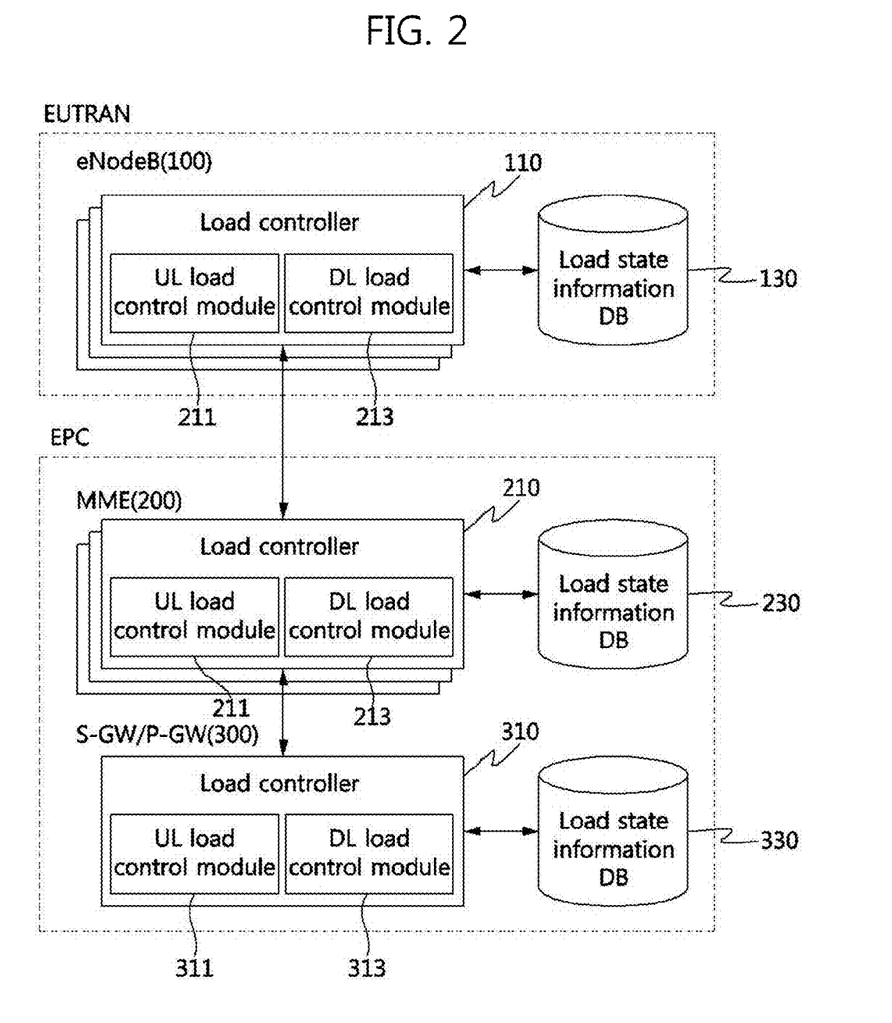
FIG. 2 is a block diagram showing a configuration of a mobile communication system for distributed load control according to an example embodiment of the present invention.

FIG. 2 is a block diagram showing a configuration of a mobile communication system for distributed load control according to an example embodiment of the present invention. FIG. 2 shows an example of a configuration of each node for performing distributed load control after at least one eNodeB 100, at least one MME 200, and a gateway (S-GW/P-GW) 300 organically interwork according to a call setup (attach) request or a tracking area update (TAU) request provided from the UE and/or the MTC terminal.

Referring to FIG. 2, the eNodeB 100, the MME 200, and the gateway (S-GW/P-GW) 300, which are nodes constituting the mobile communication system, include load controllers 110, 210, and 310, which control and manage UL and DL radio resources according to each provided call setup request (or TAU request), and load state information databases (DBs) 130, 230, and 330, which store information necessary to perform load control. In addition, the load controllers 110, 210, and 310 may include UL load control modules 111, 211, and 311, which collect and manage parameter information for load control through UL, and DL load control modules 113, 213, and 313, which collect and manage parameter information for load control through DL.

Because the operation of the call setup request (or TAU request) triggered from the UE or the MTC terminal is performed in order of the eNodeB 100, the MME 200, and the gateway (S-GW/P-GW) 300, it is possible to prevent the congestion of signaling or traffic in a specific node when load control is performed in each node and to improve the stability of a system and secure QoS by causing the nodes to perform distributed load control.

There is a problem in that a bad influence gives on system performance because the load may not be controlled if signaling is increased in a node that performs load control, or an error occurs in the node when existing centralized load control is performed.

Accordingly, a distributed load control method in which a plurality of nodes constituting the mobile communication system share the load control is more efficient. In particular, when load occurs in a specific node, it is possible to improve the system performance by notifying an adjacent node of the load to reduce the load and continuously performing the call setup request (or the TAU request) through a detour route.

Accordingly, in the mobile communication system according to an example embodiment of the present invention, the load controllers 110, 210, and 310 each included in the eNodeB 100, the MME 200, and the gateway (S-GW/P-GW) 300 share distributed load control, and the load state information DBs 130, 230, and 330 store and manage parameters collected through UL and DL to be used for a determination for load control in a load control process so that the state of a node is optimally maintained.

The load controller 110 of the eNodeB defines radio resource information and MME state information as load control determination parameters and stores the load control determination parameters in the load state information DB 130 of eNodeB. The load controller 210 of the MME defines an EPS bearer and operation states of the eNodeB 100 and the gateway (S-GW/P-GW) 200 as load control determination parameters, and stores the load control determination parameters in the load state information DB 230 of MME. The load controller 310 of the gateway (S-GW/P-GW) defines an EPS bearer, a packet filter, and MME state information as load control determination parameters, and stores the load control determination parameters in the load state information DB 330 of the gateway (S-GW/P-GW).

The load controllers 110, 210, and 310 included in the nodes compare amounts of UL and DL load collected through measurements to preset threshold values, and perform overload control if the measured load amount exceeds the threshold value.

In addition, the load controllers 110, 210, and 310 included in the nodes perform a function of receiving load information provided from other nodes through UL or DL, determining whether to perform overload control on the basis of the received load information, actually allocating wired/wireless resources, and managing the remaining resources.

The load controllers 110, 210, and 310 included in the nodes need various parameters in order to perform a load control function. It is important for the load controllers 110, 210, and 310 to maintain and manage values capable of optimizing system performance by statically and dynamically maintaining the parameter values. Accordingly, the load controllers 110, 210, and 310 derive load control parameters suitable for a network state, and apply optimum values.

The load controllers perform actual load control so that QoS is not degraded on the basis of values acquired through the UL load control modules 111, 211, and 311, and the DL load control modules 113, 213, and 313. That is, the load controllers 110, 210, and 310 receive load-related information transmitted from other nodes through the UL load control modules 111, 211, and 311, and the DL load control modules 113, 213, and 313, perform overload control if load is equal to or greater than a threshold on the basis of the received load information, and continuously monitor the system if it is normal. Overload in a radio interface may occur due to an increase in interference.

In addition, the load controllers 110, 210, and 310 allocate resources according to a call setup request (or a TAU request). Here, because information regarding the amount of occupied resources is constantly maintained in the latest state, the load controllers 110, 210, and 310 check the amount of occupied resources maintained in the latest state when there is a new call setup request, and allocate resources in a range in which the required amount of resources does not exceed the remaining amount of resources when it is determined that there are available resources.

That is, the load controllers 110, 210, and 310 maintain and manage available resources so as to optimally allocate resources according to the new call setup request (or TAU request). In addition, the load controllers 110, 210, and 310 maintain and manage the resource state from when a new call is set up to when the call is released.

Figure 3:
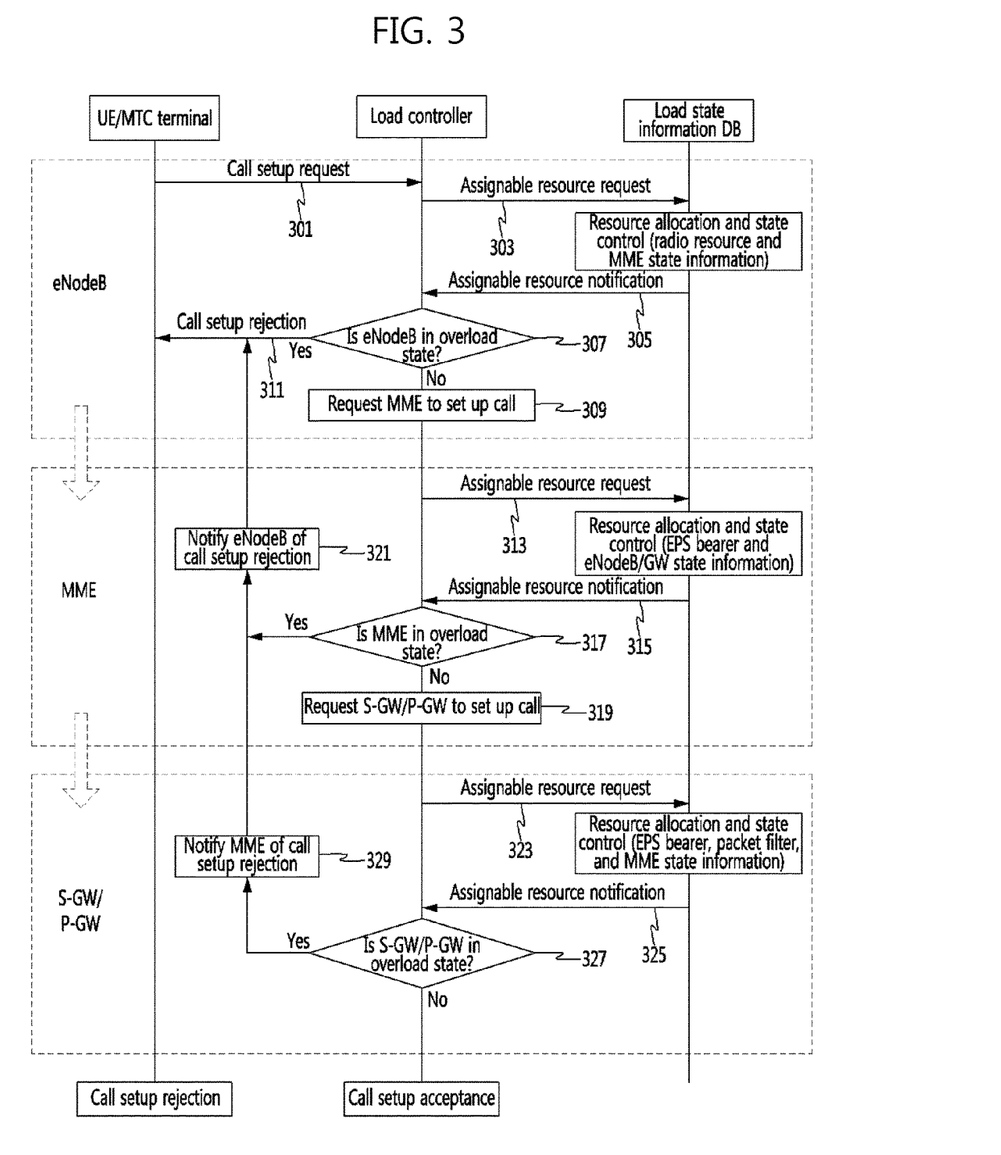
FIG. 3 is a sequence diagram showing an operation method of a distributed load control apparatus for use in a mobile communication system according to an example embodiment of the present invention.

FIG. 3 is a sequence diagram showing an operation method of a distributed load control apparatus for use in a mobile communication system according to an example embodiment of the present invention, and shows a load control method to be performed by each of the nodes (that is, the eNodeB, the MME, and the gateway (S-GW/P-GW)) according to a call setup request triggered from the UE or the MTC terminal.

First, upon receipt of the call setup request triggered from the UE or the MTC terminal (step 301), the eNodeB requests its load state information DB to provide information regarding assignable resources capable of satisfying QoS and state information of the MME by considering a call type, a call service class, QoS, and the like, as parameters for setting up a connection of a radio zone (step 303).

Thereafter, the load controller of the eNodeB acquires the assignable resource information and the MME state information from the load state information DB (step 305), and determines an overload state on the basis of the acquired information (step 307). Here, the load controller may determine the overload state by determining whether an amount of radio resources exceeds a preset threshold, and determining a state of the MME when a radio resource is allocated according to the call setup request.

If the determination result of step 307 indicates that it is not the overload state (if it is determined that there is an available resource), the load controller of the eNodeB requests the MME to perform a call setup procedure (step 309).

Alternatively, the load controller of the eNodeB determines that overload has occurred if the amount of radio resources exceeds the threshold, or if the state of the MME is abnormal (for example, the overload state), in step 307, and terminates call setup by transmitting a call setup reject message including a rejection cause to the UE or the MTC terminal making the call setup request so as to reject the call setup request (step 311). In this case, the UE or the MTC terminal may perform the call setup request through another route.

If the call setup request is transmitted from the eNodeB in a normal state, the load controller of the MME requests the load state information DB of the MME to provide assignable resource information, eNodeB state information, and gateway (S-GW/P-GW) state information by considering a call type, a call service class, QoS, and the like, as parameters for setting up a connection of a wired zone such as an EPS bearer (step 313).

Thereafter, the load controller of the MME acquires the assignable resource information, the eNodeB state information, and the gateway (S-GW/P-GW) state information from the load state information DB (step 315), and determines the overload state on the basis of the acquired information (step 317). Here, when a wired resource of the EPS bearer is allocated according to the call setup request, the load controller of the MME may determine the overload state by considering whether the amount of allocated resources exceeds a preset threshold and the states of the eNodeB and the gateway (S-GW/P-GW).

The determination result of step 317 indicates that it is not the overload state (that is, it is determined that there is an available resource), the load controller of the MME requests the gateway (S-GW/P-GW) to step up the call so as to perform the call setup procedure (step 319).

Alternatively, the load controller of the MME determines that it is the overload state if the wired resource of the EPS bearer is determined to exceed a preset threshold, or if the state of the gateway (S-GW/P-GW) is determined to be abnormal (for example, the overload state), and terminates the call setup by transmitting the call setup reject message including the rejection cause to the eNodeB so as to reject the call setup request from the eNodeB (step 321). In this case, the eNodeB may perform the call setup request through another route.

If the call setup request is transmitted from the MME in the normal state, the load controller of the gateway (S-GW/P-GW) requests the load state information DB of the gateway (S-GW/P-GW) to provide assignable resource information and MME state information by considering a call type, a call service class, QoS, and the like, as parameters for setting up a connection of a wired zone such as an EPS bearer or a packet filer (step 323).

Thereafter, the load controller of the gateway (S-GW/P-GW) acquires the assignable resource information and the MME state information from the load state information DB (step 325), and determines the overload state on the basis of the acquired information (step 327). Here, when the wired resource such as an EPS bearer or a packet filer is allocated according to the call setup request, the load controller of the gateway (S-GW/P-GW) may determine the overload state by considering whether an amount of allocated resources exceeds a preset threshold and the state of the MME.

The determination result of step 327 indicates that it is not the overload state (that is, it is determined that there is an available resource), the load controller of the gateway (S-GW/P-GW) performs the call setup procedure.

Alternatively, the load controller of the gateway (S-GW/P-GW) determines that it is the overload state if a wired resource is determined to exceed a preset threshold when the wired resource corresponding to call setup is allocated, and terminates the call setup by transmitting the call setup reject message including the rejection cause to the MME so as to reject the call setup request from the MME (step 329). In this case, the eNodeB and/or the MME perform the call setup procedure through another route, thereby providing the UE or the MTC terminal with a re-request opportunity for the call setup, increasing a success rate of the call setup request, and thus maximizing the processing performance of the system.

According to a mobile communication system for distributed load control and a distributed load control method for use in the same as described above, an MTC terminal triggers and automatically requests a call setup if an event satisfying given conditions occurs in a specific environment in a next-generation mobile communication system including an MTC service, and distributed load control is performed to cause eNodeB, MME, and a gateway (S-GW/P-GW) to share load if a call setup request of UE or the MTC terminal is generated so as to prevent congestion or overload in a system due to the congestion of signaling or traffic incomparable to that of existing UE. That is, each node determines whether to perform load control by considering overload control parameters to be managed by each node, and nodes connected to UL and DL are organically connected to each other, thereby performing distributed load control step by step.

Accordingly, in the distributed load control compared to centralized load control of the related art, it is possible to reduce the occurrence of signaling and prevent the degradation of QoS due to the congestion of traffic. In addition, it is possible to improve entire system performance by reducing the burden imposed on a specific node due to system overload, ensuring QoS, and maximizing the efficiency of system performance through the distributed load control.

While the example embodiments of the present invention and their advantages have been described in detail, it should be understood that various changes, substitutions and alterations may be made herein without departing from the scope of the invention.

What is claimed is:

1. A mobile communication system comprising:
    a base station including a first load controller configured to collect first load control information through uplink (UL) and downlink (DL), determine an available resource according to of the first load control information when a call setup request is provided from a terminal, and request a first core network device to set up a call if there is the available resource; and
    a first load state information database (DB) configured to store the first load control information,
    wherein the first load control information includes radio resource information and load state information of the first core network device,
    wherein an overload state of the first core network is determined according to the available resource of the first core network device and a load state of a second core network device.

2. The mobile communication system of claim 1, wherein the first load controller determines the available resource by comparing the radio resource information to a preset first threshold, and transmits the call setup request to the first core network device if there is the available resource, and the first core network device is not in the overload state.

3. The mobile communication system of claim 1, wherein the first core network device includes:
    a second load controller configured to collect second load control information including wired resource information and state information of the second core network device, and determine load control according to the second load control information when the call setup request is provided from the first load controller; and
    a second load state information DB configured to store the second load control information.

4. The mobile communication system of claim 3, wherein the second load controller determines an available wired resource by comparing the radio resource information to a preset second threshold, and transmits the call setup request to the second core network device if there is the available wired resource, and the second core network device is not in the overload state.

5. The mobile communication system of claim 3, wherein the second load controller transmits a call setup reject message to the base station if there is no available wired resource, or the second core network device is in the overload state.

6. The mobile communication system of claim 3, wherein the second core network device includes:
    a third load controller configured to collect third load control information including resource information for an evolved packet system (EPS) bearer and a packet filter and the state information of the first core network device, and determine load control according to the third load control information when the call setup request is provided from the second load controller; and
    a third load state information DB configured to store the third load control information.

7. The mobile communication system of claim 6, wherein the third load controller determines an available resource of the second core network device by comparing the resource information for the EPS bearer and the packet filter to a preset third threshold, and performs a call setup procedure if it is determined that there is the available resource of the second core network.

8. The mobile communication system of claim 7, wherein the third load controller transmits a call setup reject message to the first core network device if it is determined that there is no available resource of the second core network.

9. A mobile communication system including a base station, a first core network device, and a second core network device, wherein:
    the base station determines whether the base station is in an overload state according to an available resource of the base station and a load state of the first core network device according to a call setup request provided from a terminal, and transmits the call setup request to the first core network device if the base station is determined to be in a non-overload state;
    the first core network device determines whether the first core network device is in the overload state according to an available resource of the first core network device and a load state of the second core network device according to the call setup request transmitted from the base station, and transmits the call setup request to the second core network device if the first core network device is determined to be in the non-overload state; and
    the second core network device determines whether the second core network device is in the overload state according to the call setup request transmitted from the first core network device, and performs a call setup procedure if the second core network device is determined to be in the non-overload state.

10. The mobile communication system of claim 9, wherein the first core network device transmits a call setup reject message to the base station if the first core network device is determined to be in the overload state, and
the second core network device transmits the call setup reject message to the first core network device if the second core network device is in the overload state.

11. A load control method for use in a mobile communication system including a base station, a first core network device, and a second core network device, comprising:
    determining, by the base station, whether the base station is in an overload state according to an available resource of the base station and a load state of the first core network device according to a call setup request provided from a terminal;
    transmitting, by the base station, the call setup request to the first core network device if the base station is determined to be in a non-overload state;
    determining, by the first core network device, whether the first core network device is in the overload state according to an available resource of the first core network device and a load state of the second core network device according to the call setup request transmitted from the base station;

transmitting, by the first core network device, the call setup request to the second core network device if the first core network device is determined to be in the non-overload state;

determining, by the second core network device, whether the second core network device is in the overload state according to the call setup request transmitted from the first core network device; and performing, by the second core network device, a call setup procedure if the second core network device is determined to be in the non-overload state.

12. The load control method of claim 11, wherein the transmitting, by the first core network device, of the call setup request to the second core network device if the first core network device is determined to be in the non-overload state includes:

transmitting, by the first core network device, a call setup reject message to the base station if the first core network device is determined to be in the overload state.

13. The load control method of claim 11, wherein the performing, by the second core network device, of the call setup procedure if the second core network device is determined to be in the non-overload state includes:

transmitting, by the second core network device, the call setup reject message to the first core network device if the second core network device is in the overload state.

14. The load control method of claim 11, wherein the determining of whether the base station is in the overload state includes:

collecting, by the base station, radio resource information of the base station and load state information of the first core network device through UL and DL; and determining whether there is the available resource of the base station by comparing the collected radio resource information of the base station to a preset first threshold.

15. The load control method of claim 11, wherein the determining of whether the first core network device is in the overload state includes:

collecting, by the first core network device, available wired resource information of the first core network device and load state information of the second core network device; and determining whether there is the available resource of the first core network device by comparing the available wired resource information to a preset second threshold.

16. The load control method of claim 11, wherein the determining of whether the second core network device is in the overload state includes:

collecting, by the second core network device, available wired resource information of the second core network device and load state information of the first core network device; and determining whether there is an available resource of the second core network device by comparing the available wired resource information to a preset third threshold.

* * * * *